United States Patent
You et al.

(10) Patent No.: US 10,827,461 B2
(45) Date of Patent: Nov. 3, 2020

(54) ACCESS METHOD, BASE STATION, AND DEVICE

(71) Applicant: Huawei Technologies Co., Ltd., Shenzhen (CN)

(72) Inventors: Xin You, Shenzhen (CN); Da Wang, Shenzhen (CN); Yu Cai, Beijing (CN); Guorong Li, Shenzhen (CN); Jian Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/319,428

(22) PCT Filed: Jul. 22, 2016

(86) PCT No.: PCT/CN2016/091092
§ 371 (c)(1),
(2) Date: Jan. 21, 2019

(87) PCT Pub. No.: WO2018/014359
PCT Pub. Date: Jan. 25, 2018

(65) Prior Publication Data
US 2019/0335420 A1    Oct. 31, 2019

(51) Int. Cl.
*H04W 68/02* (2009.01)
*H04W 68/00* (2009.01)
(Continued)

(52) U.S. Cl.
CPC ......... *H04W 68/025* (2013.01); *H04B 1/385* (2013.01); *H04M 1/7253* (2013.01); *H04W 4/70* (2018.02); *H04W 52/0229* (2013.01); *H04W 68/005* (2013.01); *H04W 76/11* (2018.02); *H04W 76/14* (2018.02); *H04W 76/28* (2018.02); *H04W 88/04* (2013.01); *H04W 88/08* (2013.01)

(58) Field of Classification Search
CPC combination set(s) only.
See application file for complete search history.

(56) References Cited

U.S. PATENT DOCUMENTS

2009/0017843 A1    1/2009  Laroia et al.
2009/0017844 A1    1/2009  Li et al.
(Continued)

FOREIGN PATENT DOCUMENTS

CN    101267596 A    9/2008
CN    101690134 A    3/2010
(Continued)

*Primary Examiner* — Andrew Lai
*Assistant Examiner* — Mohammed M Murshid
(74) *Attorney, Agent, or Firm* — Slater Matsil, LLP

(57) ABSTRACT

A method includes: receiving, by a base station, a first message sent by a network side device, where the first message is used to instruct the base station to page a second device; determining a paging occasion, where the paging occasion is a paging occasion of a first device and/or a paging occasion of the second device; and sending a second message on the paging occasion, where the second message carries an identifier of the second device, so that the first device sends a third message to the second device based on the second message and establishes a connection to the second device based on the third message.

18 Claims, 8 Drawing Sheets

(51) Int. Cl.
*H04W 76/11* (2018.01)
*H04W 76/14* (2018.01)
*H04W 52/02* (2009.01)
*H04W 76/28* (2018.01)
*H04W 4/70* (2018.01)
*H04M 1/725* (2006.01)
*H04B 1/3827* (2015.01)
*H04W 88/04* (2009.01)
*H04W 88/08* (2009.01)

(56) References Cited

U.S. PATENT DOCUMENTS

| | | |
|---|---|---|
| 2010/0226314 A1 | 9/2010 | Xu |
| 2012/0039246 A1 | 2/2012 | Zhang et al. |
| 2013/0130684 A1 | 5/2013 | Gomes et al. |
| 2015/0195788 A1* | 6/2015 | Au et al. |
| 2016/0270028 A1* | 9/2016 | Lee et al. |
| 2017/0064671 A1* | 3/2017 | Rashid ............... H04W 68/02 |
| 2017/0142686 A1 | 5/2017 | Zhang |
| 2018/0084523 A1* | 3/2018 | Uchiyama ............ H04W 88/04 |

FOREIGN PATENT DOCUMENTS

| | | |
|---|---|---|
| CN | 102202396 A | 9/2011 |
| CN | 102480779 A | 5/2012 |
| CN | 102970750 A | 3/2013 |
| CN | 103200535 A | 7/2013 |
| CN | 103428855 A | 12/2013 |
| CN | 103581916 A | 2/2014 |
| CN | 103906098 A | 7/2014 |
| EP | 2999280 B1 | 10/2018 |
| JP | 2010533436 A | 10/2010 |
| JP | 2013529409 A | 7/2013 |
| RU | 2541939 C2 | 2/2015 |
| WO | 2011047956 A | 3/2011 |
| WO | 2016019528 A1 | 2/2016 |
| WO | 2016163206 A1 | 10/2016 |
| WO | 2017196611 A1 | 11/2017 |

* cited by examiner

ACCESS METHOD, BASE STATION, AND DEVICE

CROSS-REFERENCE TO RELATED APPLICATIONS

This application is a national stage of International Application No. PCT/CN2016/091092, filed on Jul. 22, 2016, which is hereby incorporated by reference in its entirety.

TECHNICAL FIELD

The present invention relates to the communications field, and in particular, to an access method, a base station, and a device.

BACKGROUND

In a D2D (device to device, device-to-device) relay link, a second device may be connected to a network by using a first device. The second device may be a low-capability device, for example, a wearable device. The first device may be a high-capability device, for example, a high-capability smartphone. The wearable device may be connected to the network by using the smartphone. The smartphone herein may be used as a relay node to help the wearable device access the network, thereby reducing power consumption of the wearable device.

For example, in the future, people may wear various intelligent wearable devices. Therefore, each first device may be connected to a plurality of second devices, and enable the plurality of second devices to be connected to the network by using the first device as a relay. Therefore, a solution of accessing UE (the first device) by the wearable device needs to be researched.

SUMMARY

Embodiments of the present invention provide an access method, a base station, and a device, to enable a wearable device to access UE and perform data transmission with a network side by using the UE.

The following technical solutions are used in the embodiments of the present invention to achieve the foregoing objective.

According to a first aspect, an access method is disclosed and is applied to a D2D relay system. The D2D relay system includes a base station, at least one first device, and at least one second device paired with the first device. The method includes: receiving, by the base station, a first message sent by a network side device, where the first message is used to instruct the base station to initiate, after receiving the message, a procedure of paging the second device; further, determining, by the base station, a paging occasion, where the paging occasion is a paging occasion of the first device and/or a paging occasion of the second device; finally, sending, by the base station, a second message on the paging occasion, where the second message carries an identifier of the second device, so that the first device can send a third message to the second device based on the identifier of the second device to establish a connection to the second device based on the third message.

In the access method provided in the present invention, when needing to transmit downlink data to the second device, the network side device can initiate paging to the second device by using the base station, and the base station sends the second message on the paging occasion of the first device and/or the paging occasion of the second device. Further, the first device may determine, based on the identifier of the second device that is carried in the second message, that the second device is paged, and send the third message to the second device. After receiving the third message, the second device may synchronize with the first device based on the third message, identify the first device, and finally establish the connection to the first device. Subsequently, the network side device may send, to the first device, the downlink data needing to be sent to the second device, and the first device relays the downlink data to the second device. The foregoing procedure enables a wearable device (the second device) to access UE. In a D2D scenario, the wearable device can perform data transmission with a network side by using the UE as a relay.

With reference to the first aspect, in a first possible implementation of the first aspect, if the paging occasion is the paging occasion of the first device and the paging occasion of the second device, the sending, by the base station, a second message on the paging occasion specifically includes: sending, by the base station, a first paging message on the paging occasion of the first device, and sending a second paging message on the paging occasion of the second device, so that the first device receives the first paging message on the paging occasion of the first device, determines, based on the identifier of the second device that is in the first paging message, that the second device is paged, and sends the third message to the second device, to establish the connection to the second device based on the third message. The first paging message is used to page the first device and carries the identifier of the second device. The second paging message is used to page the second device and carries the identifier of the second device. Certainly, the second device also wakes on the paging occasion of the second device to receive the second paging message, and determines, based on the identifier of the second device that is carried in the second paging message, that the second device is paged.

In the first implementation, the second message is the first paging message and the second paging message, that is, the base station may page the first device and the second device. The first paging message received by the first device carries the identifier of the second device. Therefore, the first device may determine, based on the paging message of the base station, that the second device is paged. In this way, the first device sends the third message to the second device, to establish the connection between the first device and the second device.

With reference to the first aspect, in a second possible implementation of the first aspect, if the paging occasion is the paging occasion of the second device, the sending, by the base station, a second message on the paging occasion specifically includes: sending, by the base station, a second paging message on the paging occasion of the second device, where the second paging message is used to page the second device and carries the identifier of the second device, so that the first device determines, after receiving the second paging message on the paging occasion of the second device, that the second device is paged, and sends the third message to the second device, to establish the connection to the second device based on the third message.

In the second implementation, the second message is the second paging message. The base station pages only the second device on the paging occasion of the second device. However, the first device may calculate the paging occasion of the second device based on the identifier of the second device. Further, the first device may receive the paging message of the base station on the paging occasion of the second device, and determine, based on the paging message, that the second device is paged. In this way, the first device sends the third message to the second device, so that the first device and the second device establish the connection.

With reference to the first aspect, in a third possible implementation of the first aspect, if the paging occasion is the paging occasion of the first device, the sending, by the base station, a second message on the paging occasion specifically includes: sending, by the base station, a second paging message on the paging occasion of the first device, where the second paging message is used to page the second device and carries the identifier of the second device, so that the first device detects the second paging message on the paging occasion of the first device, determines, based on the identifier of the second device that is carried in the second paging message, that the second device is paged, and sends the third message to the second device, to establish the connection to the second device based on the third message.

In the third implementation, the second message is the second paging message. The base station pages only the second device on the paging occasion of the first device. Further, the first device may receive the paging message of the base station on the paging occasion of the first device, and determine, based on the paging message, that the second device is paged. In this way, the first device sends the third message to the second device, so that the first device and the second device establish the connection.

With reference to any one of the first aspect or the first to the third possible implementations of the first aspect, in a fourth possible implementation of the first aspect, the determining, by the base station, a paging occasion specifically includes: calculating, by the base station, the paging occasion of the first device based on an identifier of the first device; and/or calculating, by the base station, the paging occasion of the second device based on the identifier of the second device.

According to a second aspect, an access method is disclosed and is applied to a D2D relay system. The D2D relay system includes a base station, at least one first device, and at least one second device paired with the first device. The method includes: receiving, by the first device, a second message sent by the base station, where the second message carries an identifier of the second device; and next, determining, by the first device based on the identifier of the second device that is carried in the second message, that the second device is paged, and then sending a third message to the second device, to establish a connection to the second device based on the third message.

With reference to the second aspect, in a first possible implementation of the second aspect, the receiving, by the first device, a second message sent by the base station includes: receiving, by the first device, a first paging message on a paging occasion of the first device, where the first paging message is used to page the first device, the first paging message carries the identifier of the second device, and the first paging message is sent by the base station on the paging occasion of the first device.

Further, the first device determines, based on the identifier of the second device that is carried in the first paging message, that the second device is paged.

With reference to the second aspect, in a second possible implementation of the second aspect, the receiving, by the first device, a second message sent by the base station includes: receiving, by the first device, a second paging message on a paging occasion of the second device, where the second paging message is used to page the second device and carries the identifier of the second device, and the second paging message is sent by the base station on the paging occasion of the second device.

Further, the first device determines, based on the identifier of the second device that is carried in the second paging message, that the second device is paged.

With reference to the second aspect, in a third possible implementation of the second aspect, the receiving, by the first device, a second message sent by the base station includes: receiving, by the first device, a second paging message on a paging occasion of the first device, where the second paging message is used to page the second device and carries the identifier of the second device, and the second paging message is sent by the base station on the paging occasion of the first device. In addition, the second device calculates the paging occasion of the first device, wakes on the paging occasion of the first device to receive the second paging message, and determines, based on the identifier of the second device that is carried in the second paging message, that the second device is paged.

Further, the first device determines, based on the identifier of the second device that is carried in the second paging message, that the second device is paged.

With reference to any one of the second aspect or the first to the third possible implementations of the first aspect, in a fourth possible implementation of the second aspect, the sending, by the first device, a third message to the second device includes: calculating, by the first device, a third-message sending time point, and sending the third message to the second device at the third-message sending time point; or calculating, by the first device, a message sending time length, and continuously sending the third message to the second device within the message sending time length, that is, continuously sending the third message to the second device within a period of time; or sending, by the first device, the third message to the second device after receiving the second message (where the second message received by the first device is the first paging message or the second paging message), and if receiving a feedback message from the second device, stopping sending the third message to the second device.

According to a third aspect, a base station is disclosed. The base station includes: a receiving unit, configured to receive a first message sent by a network side device, where the first message is used to instruct the base station to page a second device; a determining unit, configured to determine a paging occasion, where the paging occasion is a paging occasion of a first device and/or a paging occasion of the second device; and a sending unit, configured to send a second message on the paging occasion, where the second message carries an identifier of the second device, so that the first device sends a third message to the second device based on the second message and establishes a connection to the second device based on the third message.

With reference to the third aspect, in a first possible implementation of the third aspect, if the paging occasion is the paging occasion of the first device and the paging occasion of the second device, the sending unit is specifically configured to: send a first paging message on the paging occasion of the first device, where the first paging message is used to page the first device, and the first paging message carries the identifier of the second device; and send a second paging message on the paging occasion of the second device, where the second paging message is used to page the second device, and the second paging message carries the identifier of the second device, so that the first device sends the third message to the second device based on the identifier of the second device and establishes the connection to the second device based on the third message.

With reference to the third aspect, in a second possible implementation of the third aspect, if the paging occasion is the paging occasion of the second device, the sending unit is specifically configured to send a second paging message on the paging occasion of the second device, where the second paging message is used to page the second device, and the second paging message carries the identifier of the second device, so that the first device receives the second paging message on the paging occasion of the second device, and subsequently, the first device sends the third message to the second device based on the second paging message and establishes the connection to the second device based on the third message.

With reference to the third aspect, in a third possible implementation of the third aspect, if the paging occasion is the paging occasion of the first device, the sending unit is specifically configured to send a second paging message on the paging occasion of the first device, where the second paging message is used to page the second device, and the second paging message carries the identifier of the second device, so that the first device sends the third message to the second device and establishes the connection to the second device based on the third message.

With reference to any one of the third aspect or the first to the third possible implementations of the third aspect, in a fourth possible implementation of the third aspect, the determining unit is specifically configured to: calculate the paging occasion of the first device based on an identifier of the first device; and/or calculate the paging occasion of the second device based on the identifier of the second device.

According to a fourth aspect, a first device is disclosed. The first device includes: a receiving unit, configured to receive a second message sent by a base station, where the second message carries an identifier of a second device; a determining unit, configured to determine, based on the identifier of the second device that is carried in the second message, that the second device is paged; and a sending unit, configured to send a third message to the second device, to establish a connection to the second device based on the third message.

With reference to the fourth aspect, in a first possible implementation of the fourth aspect, the receiving unit is specifically configured to receive a first paging message on a paging occasion of the first device, where the first paging message is used to page the first device, and the first paging message carries the identifier of the second device.

With reference to the first possible implementation of the fourth aspect, in a second possible implementation of the fourth aspect, the determining unit is specifically configured to determine, based on the identifier of the second device that is carried in the first paging message, that the second device is paged.

With reference to the fourth aspect, in a third possible implementation of the fourth aspect, the receiving unit is specifically configured to receive a second paging message on a paging occasion of the second device, where the second paging message is used to page the second device, and the second paging message carries the identifier of the second device.

With reference to the third possible implementation of the fourth aspect, in a fourth possible implementation of the fourth aspect, the determining unit is specifically configured to determine, based on the identifier of the second device that is carried in the second paging message, that the second device is paged.

With reference to the fourth aspect, in a fifth possible implementation of the fourth aspect, the receiving unit is specifically configured to receive a second paging message on a paging occasion of the first device, where the second paging message is used to page the second device, and the second paging message carries the identifier of the second device.

With reference to the fifth possible implementation of the fourth aspect, in a sixth possible implementation of the fourth aspect, the determining unit is specifically configured to determine, based on the identifier of the second device that is carried in the second paging message, that the second device is paged.

With reference to any one of the fourth aspect or the first to the sixth possible implementations of the fourth aspect, in a seventh possible implementation of the fourth aspect, the first device further includes a calculation unit, where the calculation unit is configured to calculate a third-message sending time point; and the sending unit is configured to send the third message to the second device at the third-message sending time point; or the calculation unit is configured to calculate a message sending time length; and the sending unit is configured to send the third message to the second device within the message sending time length; or the sending unit is configured to send the third message to the second device, and if the receiving unit receives a feedback message from the second device, stop sending the third message to the second device.

According to a fifth aspect, a base station is disclosed. The base station includes: a transceiver, configured to receive a first message sent by a network side device, where the first message is used to instruct the base station to page a second device; a processor, configured to determine a paging occasion, where the paging occasion is a paging occasion of a first device and/or a paging occasion of the second device; and a transceiver, configured to send a second message on the paging occasion, where the second message carries an identifier of the second device, so that the first device sends a third message to the second device based on the second message and establishes a connection to the second device based on the third message.

With reference to the fifth aspect, in a first possible implementation of the fifth aspect, if the paging occasion is the paging occasion of the first device and the paging occasion of the second device, the transceiver is specifically configured to: send a first paging message on the paging occasion of the first device, where the first paging message is used to page the first device, and the first paging message carries the identifier of the second device; and send a second paging message on the paging occasion of the second device, where the second paging message is used to page the second device, and the second paging message carries the identifier of the second device, so that the first device sends the third message to the second device based on the identifier of the second device and establishes the connection to the second device based on the third message.

With reference to the fifth aspect, in a second possible implementation of the fifth aspect, if the paging occasion is the paging occasion of the second device, the transceiver is specifically configured to send a second paging message on the paging occasion of the second device, where the second paging message is used to page the second device, and the second paging message carries the identifier of the second device, so that the first device sends the third message to the second device and establishes the connection to the second device based on the third message.

With reference to the fifth aspect, in a third possible implementation of the fifth aspect, if the paging occasion is the paging occasion of the first device, the transceiver is specifically configured to send a second paging message on the paging occasion of the first device, where the second paging message is used to page the second device, and the second paging message carries the identifier of the second device, so that the first device sends the third message to the second device and establishes the connection to the second device based on the third message.

With reference to any one of the fifth aspect or the first to the third possible implementations of the fifth aspect, in a fourth possible implementation of the fifth aspect, the processor is specifically configured to: calculate the paging occasion of the first device based on an identifier of the first device; and/or calculate the paging occasion of the second device based on the identifier of the second device.

According to a sixth aspect, a first device is disclosed. The first device includes: a transceiver, configured to receive a second message sent by a base station, where the second message carries an identifier of a second device; a processor, configured to determine, based on the identifier of the second device that is carried in the second message, that the second device is paged; and a transceiver, configured to send a third message to the second device, to establish a connection to the second device based on the third message.

With reference to the sixth aspect, in a first possible implementation of the sixth aspect, the transceiver is specifically configured to receive a first paging message on a paging occasion of the first device, where the first paging message is used to page the first device, and the first paging message carries the identifier of the second device.

With reference to the first possible implementation of the sixth aspect, in a second possible implementation of the sixth aspect, the processor is specifically configured to determine, based on the identifier of the second device that is carried in the first paging message, that the second device is paged.

With reference to the sixth aspect, in a third possible implementation of the sixth aspect, the transceiver is specifically configured to receive a second paging message on a paging occasion of the second device, where the second paging message is used to page the second device, and the second paging message carries the identifier of the second device.

With reference to the third possible implementation of the sixth aspect, in a fourth possible implementation of the sixth aspect, the processor is specifically configured to determine, based on the identifier of the second device that is carried in the second paging message, that the second device is paged.

With reference to the sixth aspect, in a fifth possible implementation of the sixth aspect, the transceiver is specifically configured to receive a second paging message on a paging occasion of the first device, where the second paging message is used to page the second device, and the second paging message carries the identifier of the second device.

With reference to the fifth possible implementation of the sixth aspect, in a sixth possible implementation of the sixth aspect, the processor is specifically configured to determine, based on the identifier of the second device that is carried in the second paging message, that the second device is paged.

With reference to any one of the sixth aspect or the first to the sixth possible implementations of the sixth aspect, in a seventh possible implementation of the sixth aspect, the processor is configured to calculate a third-message sending time point; and the transceiver is configured to send the third message to the second device at the third-message sending time point; or the processor is configured to calculate a message sending time length; and the transceiver is configured to send the third message to the second device within the message sending time length; or the transceiver is configured to send the third message to the second device, and if the transceiver receives a feedback message from the second device, stop sending the third message to the second device.

BRIEF DESCRIPTION OF THE DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and persons of ordinary skill in the art may still derive other drawings from these accompanying drawings without creative efforts.

DETAILED DESCRIPTION OF ILLUSTRATIVE EMBODIMENTS

Figure 1:
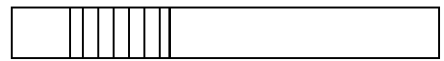
FIG. 1 is a schematic diagram of frame structures of a PF and a PO.

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by persons of ordinary skill in the art based on the embodiments of the present invention without creative efforts shall fall within the protection scope of the present invention.

In a D2D relay link, a second device may be connected to a network by using a first device.

Usually, the second device has a small volume, a small battery capacity, and a low radio frequency capability. Therefore, power consumed by the second device needs to be reduced, to prolong a standby time of the second device.

The first device is a high-capability device, and may be used as a relay node to help a low-capability device connect to the network, to reduce power consumption of the second device.

During specific implementation, the second device may be a wearable device (Wearable Device, WD), and the first device may be user equipment (User Equipment, UE) such as a smartphone. The UE can relay a plurality of WDs.

In the future, people wear various intelligent wearable devices. These devices need to be connected to the network to transmit data or establish a voice telephone service. These wearable devices may be connected to the network by using the smartphone as a relay. For example, the wearable device may upload health data such as a blood pressure and a heart rate to the network by using a mobile phone.

Therefore, how to access the UE by the wearable device needs to be researched. In addition, a solution of paging the wearable device by the base station or the mobile phone and a solution of accessing the UE by the wearable device after receiving paging also need to be researched.

The present invention provides a procedure of paging the wearable device by a network side. Specifically, the base station may page the wearable device on a paging occasion of the UE (the first device) and/or a paging occasion of the wearable device (the second device). After determining that the wearable device is paged, the UE sends a particular message to the wearable device. After receiving the message, the wearable device may identify the UE based on the message, and establish a connection to the UE.

First, technical terms in the present invention are explained as follows:

(1) Paging:

Different from broadcasting, paging refers to paging (paging) messages sent to some devices in a targeted manner.

For example, when the network side needs to send downlink data to UE in an ECM-IDLE state (that is, an idle state), an MME (Mobility Management Entity, mobility management entity) sends a paging message to all eNodeBs in all TAs (Tracking Areas) that the UE registers with. Then, the eNodeB sends a paging message to the UE by using an air interface to page the UE. If the UE is in an RRC_IDLE state (that is, an idle state), after receiving the paging message, the UE may initiate an RRC connection establishment process to receive calling.

(2) Paging Occasion:

Usually, in a particular subframe (referred to as a PF) in a discontinuous reception cycle (Discontinuous Reception, DRX) of a device (for example, UE), the UE attempts to receive a paging message in a particular subframe (referred to as a PO) of the PF. PO refers to a number of a subframe for sending/receiving the paging message in a radio frame (that is, the PF). The PO herein is the paging occasion.

It should be noted that the PF refers to a number of a radio frame for sending paging over an LTE air interface, and is a radio frame. For example, as shown in FIG. 1, the PF may include one or more POs. The PF and the PO together constitute a paging occasion of the LTE air interface, that is, an occasion on which the UE wakes from the idle state in the DRX to receive paging.

Figure 2:
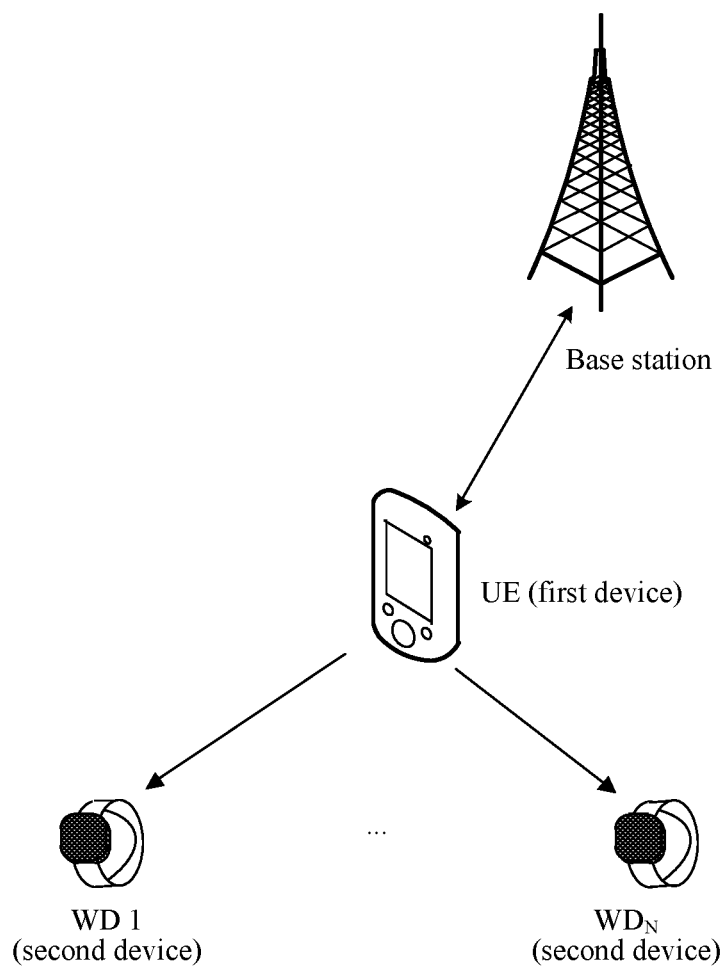
FIG. 2 is an architectural diagram of a relay system according to an embodiment of the present invention.

An embodiment of the present invention provides a relay system. For example, as shown in FIG. 2, the relay system includes a base station, at least one first device, and at least one second device paired with the first device. The first device can directly perform data transmission with the base station. The second device may access a network by using the first device, to implement data transmission with the base station by using the first device as a relay. The base station may be an eNB (E-UTRAN NodeB), the first device may be UE, and the second device paired with the UE may be a WD 1 and a WD 2.

Figure 3:
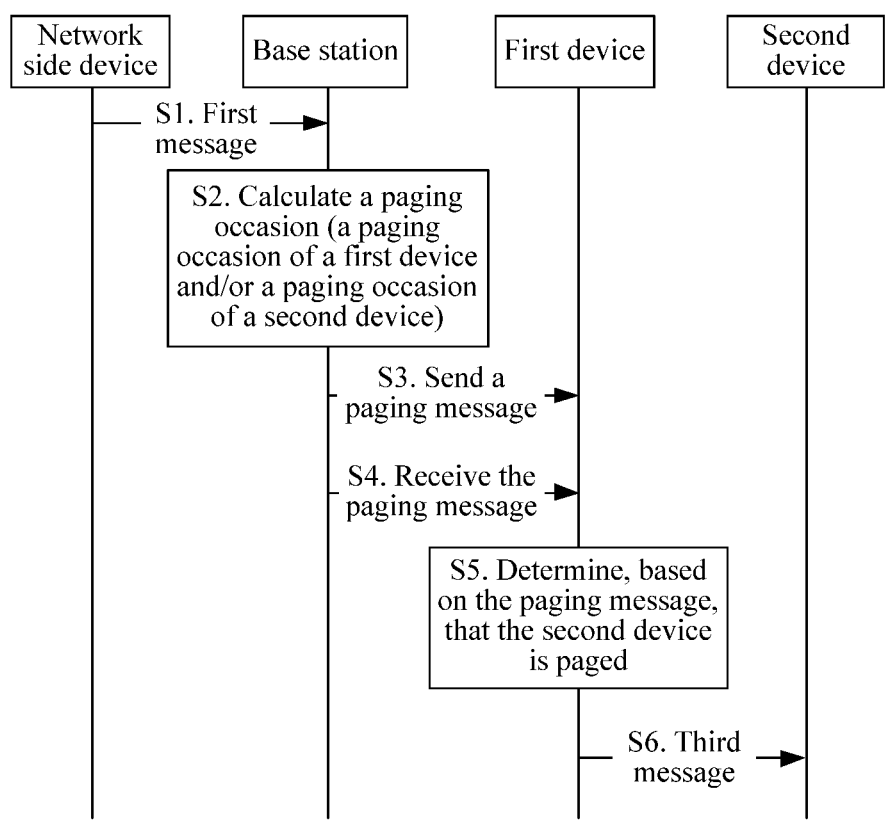
FIG. 3 is a schematic flowchart of an access method according to an embodiment of the present invention.

Further, an embodiment of the present invention provides an access method. In the method, a first device and a second device are paired, and record an identifier (ID) of the other. In addition, the first device is in an RRC_IDLE state. As shown in FIG. 3, the method includes the following steps.

S1: A base station receives a first message sent by a network side device.

During specific implementation, the first message is used to instruct the base station to page the second device. When the network side device (an MME) needs to page the second device, for example, when the MME needs to send downlink data to the second device, the MME sends the first message to the first device to initiate an entire paging process.

It should be noted that the first message is also a paging message, and is used to indicate that the network side device needs to transmit the downlink data to the second device. After receiving the message, the base station initiates a procedure of paging the second device.

S2: The base station determines a paging occasion, where the paging occasion is a paging occasion of the first device and/or a paging occasion of the second device.

During specific implementation, the base station calculates the paging occasion of the first device based on an identifier of the first device and a parameter of the first device; and/or the base station calculates the paging occasion of the second device based on an identifier of the second device and a parameter of the second device.

Specifically, a PF is a system frame satisfying the following formula (a):

$$SFN \bmod T = (T \text{ div } N)*(UE\_ID \bmod N) \quad (a)$$

A PO may be obtained by searching Table 1 (a parameter description table of a PF/PO formula) by using an index i_s. i_s is obtained by using the following formula (b):

$$i\_s = \text{floor}(UE\_ID/N) \bmod Ns \quad (b)$$

For UE, the PF is a system frame used to send a second message (paging), and the PO is a subframe used to send the paging in the PF.

TABLE 1

| Parameter | Description |
| --- | --- |
| $T_c$ (by using a system frame as a unit) | A particular default DRX cycle of a cell, configured by using IE: PCCH-Config -> defaultPagingCycle of a SIB 2 |
| $T_{ue}$ (by using a system frame as a unit) | A particular DRX cycle of UE, configured by an MME by using IE: Paging DRX (refer to the chapter 9.2.1.16 in 36.413) |
| T (by using a system frame as a unit) | A DRX cycle finally used by the UE, where $T = \min(T_c, T_{UE})$. If the MME does not configure the particular DRX cycle of the UE, the default DRX cycle, that is, defaultPagingCycle, is used. |
| nB | Value: 4T, 2T, T, T/2, T/4, T/8, T/16, or T/32. Actually, nB indicates a quantity of POs included in each DRX cycle (configured by using IE: PCCH-Config -> nB of the SIB 2). |
| N | $N = \min(T, nB)$. Actually, N indicates a quantity of PFs included in each DRX cycle. |
| $N_S$ | $N_S = \max(1, nB/T)$. Actually, $N_S$ indicates a quantity of POs included in each PF. |
| UE_ID | IMSI mod 1024 |

It should be noted that T div N is equivalent to a quantity of system frames in each part after one DRX cycle is equally divided into N parts. UE_ID mod N is equivalent to the (UE_ID mod N)$^{th}$ (where a value ranges from 0 to N−1) part in the N parts. PF is the first system frame in the (UE_ID mod N)$^{th}$ part.

S3: The base station sends a second message on the paging occasion, where the second message carries an identifier of the second device.

During specific implementation, the base station may send the second message in the following three manners, including:

First, if the paging occasion is the paging occasion of the first device and the paging occasion of the second device, the base station sends a first paging message on the paging occasion of the first device, and sends a second paging message on the paging occasion of the second device, so that the first device determines, based on the identifier of the second device after receiving the first paging message on the paging occasion of the first device, that the second device is paged, and sends a third message to the second device, to establish a connection to the second device based on the third message.

The first paging message is used to page the first device, and the first paging message carries the identifier of the second device. The second paging message is used to page the second device and carries the identifier of the second device.

Second, if the paging occasion is the paging occasion of the second device, the base station sends a second paging message on the paging occasion of the second device, where the second paging message is used to page the second device and carries the identifier of the second device, so that the first device determines, after receiving the second paging message on the paging occasion of the second device, that the second device is paged, and sends a third message to the second device, to establish a connection to the second device based on the third message.

Third, if the paging occasion is the paging occasion of the first device, the sending, by the base station, a second message on the paging occasion specifically includes: sending, by the base station, a second paging message on the paging occasion of the first device, where the second paging message is used to page the second device and carries the identifier of the second device, so that the first device detects, on the paging occasion of the first device, that the second device is paged, and sends a third message to the second device, to establish a connection to the second device based on the third message.

S4: The first device receives the second message sent by the base station.

Opposite to the foregoing three manners of sending the second message by the base station, there are also three manners of receiving the second message by the first device herein:

First, the first device receives the first paging message on the paging occasion of the first device, where the first paging message is used to page the first device, and the first paging message carries the identifier of the second device.

Second, the first device receives the second paging message on the paging occasion of the second device, where the second paging message is used to page the second device.

Third, the first device receives the second paging message on the paging occasion of the first device, where the second paging message is used to page the second device.

S5: The first device determines, based on the paging message, that the second device is paged.

Correspondingly, if the received paging message is different, a specific method for determining that the second device is paged is different. Specifically, the method includes: determining, by the first device based on the identifier of the second device that is carried in the first paging message, that the second device is paged; or determining, by the first device based on the identifier of the second device that is carried in the second paging message, that the second device is paged.

S6: The first device sends a third message to the second device, to establish a connection to the second device based on the third message.

During specific implementation, there are the following three manners of sending the third message to the second device by the first device: calculating, by the first device, a third-message sending time point, and sending the third message to the second device at the third-message sending time point; or calculating, by the first device, a message sending time length, and sending the third message to the second device within the message sending time length; or sending, by the first device, the third message to the second device, and if receiving a feedback message from the second device, stopping sending the third message to the second device.

The first device sends the third message to the second device. After receiving the third message, the second device synchronizes with the first device, measures and identifies the first device, and accesses a network by using the first device. In addition, the connection between the second device and the first device may be an NFCC (near-field communication) connection. Therefore, power consumption of the second device can be reduced, and a transmission rate of the second device can be improved.

Embodiment 1

An embodiment of the present invention provides an access method. An eNodeB can directly interact with UE (a first device), and a WD (a second device) needs to establish a connection to the eNodeB by using the UE as a relay. A procedure of paging the WD so that the WD accesses the UE is described in detail below with reference to FIG. 4.

101: When an MME needs to transmit downlink data to the WD, the MME sends a first message to the eNodeB.

The first message is also a paging message, and is used to instruct the base station to page the second device. When needing to transmit the downlink data to the second device, the network side device sends the first message to the eNodeB. After receiving the message, the base station initiates a procedure of paging the WD.

102: The eNodeB receives the first message sent by the MME, calculates a paging occasion PO 1 of the WD based on an ID (an identifier) of the WD that is indicated in the message, and calculates a paging occasion PO 2 of the UE based on an ID (an identifier) of the UE that is indicated in the message.

103: The eNodeB pages the UE on the paging occasion PO 2 of the UE.

Specifically, a first paging message is sent to the UE on the PO 2, and the first paging message carries the ID of the WD.

104: The eNodeB pages the WD on the paging occasion PO 1 of the WD.

Specifically, a second paging message is sent to the WD on the PO 1, and is used to page the WD. In addition, the second paging message also carries the ID of the WD.

105: The UE receives the first paging message, and sends a third message to the WD after identifying the ID of the WD that is carried in the first paging message.

Specifically, the UE receives the paging message from the base station on the PO 2. Certainly, the WD also wakes on the paging occasion PO 1 of the WD to receive the second paging message from the base station. In addition, the UE may further send the third message to the WD with reference to the three manners shown in FIG. 5, specifically including:
  a. calculating a third-message sending time point T, and sending the third message to the WD at the third-message sending time point T; or
  b. calculating a message sending time length, and sending the third message to the WD within the message sending time length, that is, continuously sending the third message to the WD within a period of time; or
  c. continuously sending, by the UE, the third message to the WD after receiving the first paging message, and if receiving a feedback message from the WD, stopping sending the third message to the WD.

106: The WD receives the third message, identifies the UE based on the third message, and establishes a connection to the UE.

Figure 4:
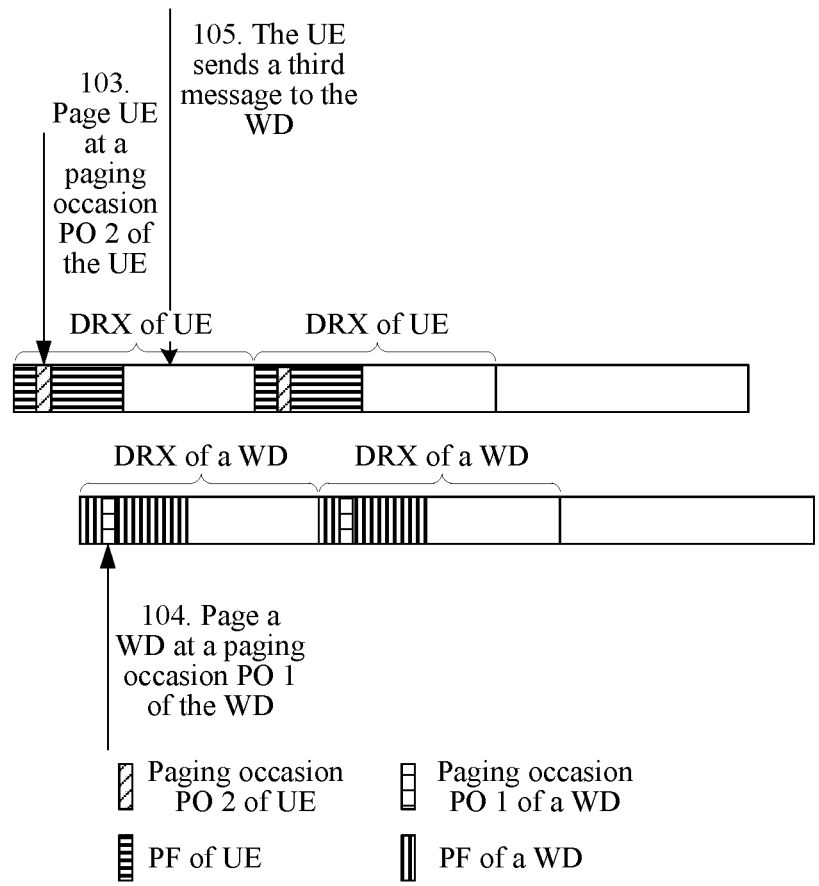
FIG. 4 is a schematic diagram of a time sequence of paging a WD according to an embodiment of the present invention.

It should be noted that the UE and the WD herein have been paired with each other before step 101, and know the ID of the other. In addition, the UE is in an RRC_IDLE state. For ease of understanding of the paging process, FIG. 4 shows only the foregoing steps 103 to 105 in a time sequence and does not show remaining steps in the foregoing method, but it does not indicate that the foregoing method does not include these steps.

Embodiment 2

Figure 6:
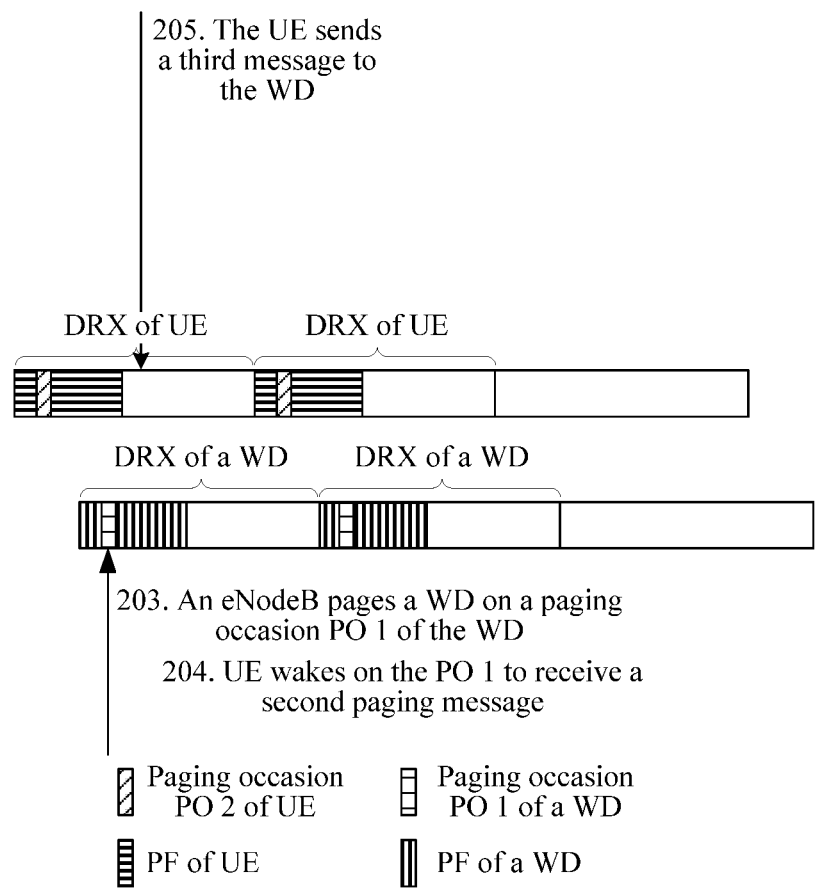
FIG. 6 is another schematic diagram of a time sequence of paging a WD according to an embodiment of the present invention.

An embodiment of the present invention provides an access method. An eNodeB can directly interact with UE, and a WD needs to establish a connection to the eNodeB by using the UE as a relay. A procedure of paging the WD so that the WD accesses the UE is described in detail below with reference to FIG. 6:

201: When an MME needs to transmit downlink data to the WD, the MME sends a first message to the eNodeB.

202: The eNodeB receives the first message sent by the MME, and calculates a paging occasion PO 1 of the WD based on an ID (an identifier) of the WD that is indicated in the message.

Steps 201 and 202 in this embodiment are the same as steps 101 and 102 in the foregoing embodiment, and details are not described herein again.

203: The eNodeB pages the WD on the paging occasion PO 1 of the WD.

Specifically, a second paging message is sent to the WD on the PO 1, and is used to page the WD.

204: The UE receives a second paging message.

Specifically, the UE calculates the paging occasion PO 1 of the WD based on a parameter of the WD, wakes on the PO 1 to receive the second paging message, and further determines that the WD is paged.

In addition, the WD may alternatively wake on the paging occasion of the WD, that is, the PO 1, to receive the second paging message.

205: The UE sends a third message to the WD.

The UE sends the third message to the WD after receiving the second paging message. In addition, the UE may further send the third message to the WD with reference to the three manners shown in FIG. 5, and details are not described herein again.

206: The WD receives the third message, identifies the UE based on the third message, and establishes a connection to the UE.

It should be noted that the UE and the WD herein have been paired with each other before step 101, and know an ID of the other. In addition, the UE is in an RRC_IDLE state.

Embodiment 3

Figure 7:
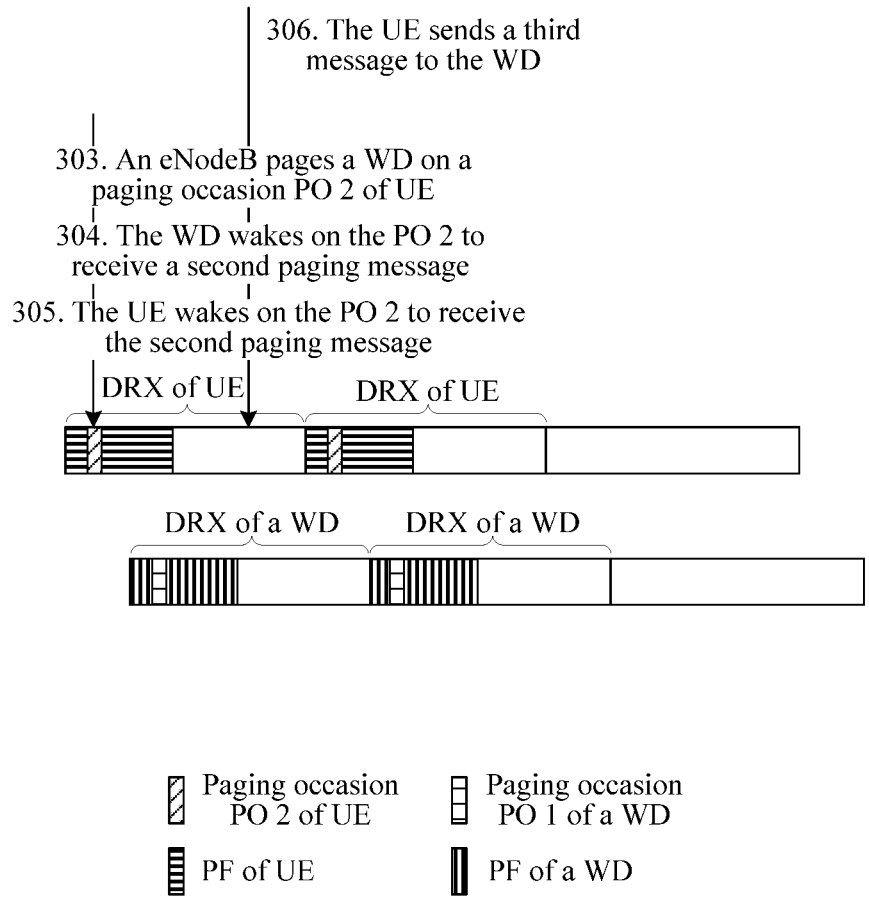
FIG. 7 is another schematic diagram of a time sequence of paging a WD according to an embodiment of the present invention.

An embodiment of the present invention provides an access method. An eNodeB can directly interact with UE, and a WD needs to establish a connection to the eNodeB by using the UE as a relay. A procedure of paging the WD so that the WD accesses the UE is described in detail below with reference to FIG. 7:

301: When an MME needs to transmit downlink data to the WD, the MME sends a first message to the eNodeB.

Step 301 in this embodiment is the same as step 101 in the foregoing embodiment, and details are not described herein again.

302: The eNodeB receives the first message sent by the MME, and determines that a paging occasion is a paging occasion PO 2 of the UE.

303: The eNodeB pages the WD on the paging occasion PO 2 of the UE.

Specifically, a second paging message is sent to the WD on the PO 1, and is used to page the WD. In addition, the second paging message further carries an ID of the WD.

304: The WD calculates the paging occasion PO 2 of the UE based on a parameter of the UE, and wakes on the PO 2 to receive the second paging message sent by the eNodeB.

305: The UE wakes on the paging occasion PO 2 of the UE to receive the second paging message.

Certainly, the UE determines, based on the ID of the WD that is carried in the second paging message, that the WD is paged, and further triggers to perform step 306.

306: The UE sends a third message to the WD.

Figure 5:
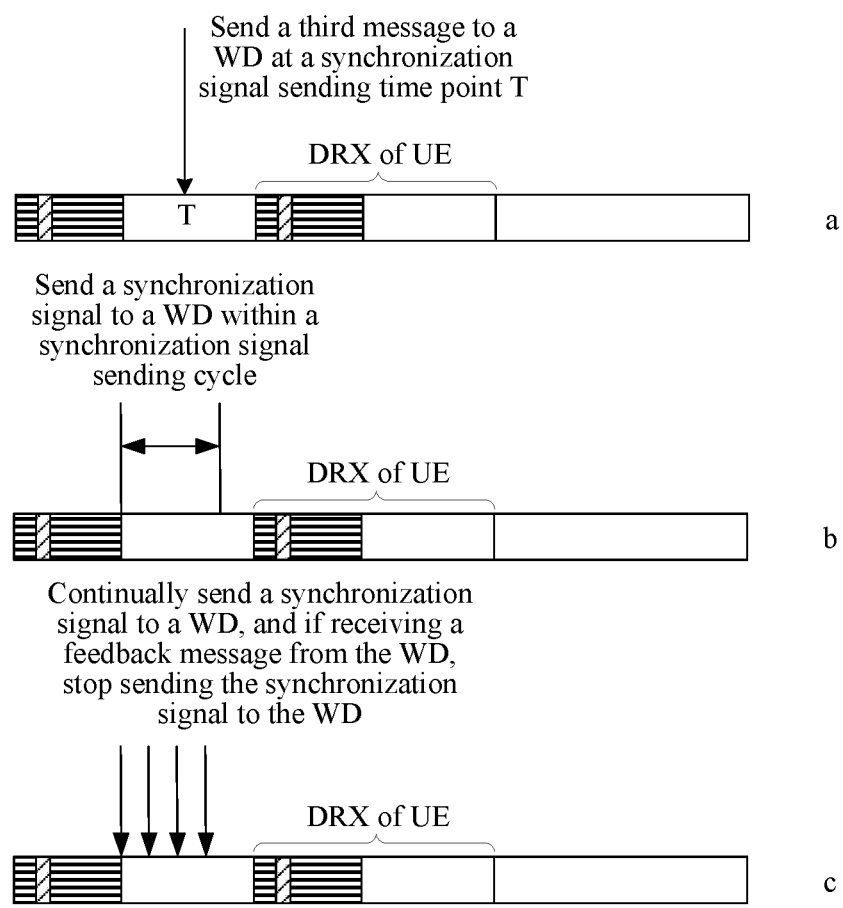
FIG. 5 is a schematic diagram of a method for sending a third message by UE according to an embodiment of the present invention.

The UE may further send the third message to the WD with reference to the three manners shown in FIG. 5, and details are not described herein again.

307: The WD receives the third message, identifies the UE based on the third message, and establishes a connection to the UE.

It should be noted that the UE and the WD herein have been paired with each other before step 101, and know an ID of the other. In addition, the UE is in an RRC_IDLE state.

In the access method provided in the present invention, when needing to transmit the downlink data to the WD (the second device), the network side device can initiate paging to the second device by using the base station, and the base station sends the second message on the paging occasion of the UE (the first device) and/or the paging occasion of the WD. Further, the UE may determine, based on the identifier of the WD that is carried in the second message, that the WD is paged, and send the third message to the WD. After receiving the third message, the WD may synchronize with the UE based on the third message, identify the UE, and finally establish the connection to the UE. Subsequently, the network side device may send, to the UE, the downlink data needing to be sent to the WD, and the UE relays the downlink data to the WD. The foregoing procedure enables a wearable device (the second device) to access the UE. In a D2D scenario, the wearable device can perform data transmission with the network side by using the UE as a relay.

The foregoing mainly describes the solutions provided in the embodiments of the present invention from the perspective of interaction between network elements. It may be understood that to achieve the foregoing functions, the network elements such as the base station and the UE (the first device) include corresponding hardware structures and/or software modules for performing the functions. Persons skilled in the art should be easily aware that, examples of the units and algorithm steps that are described with reference to the embodiments disclosed in this specification may be implemented by hardware or a combination of hardware and computer software in the present invention. Whether the functions are performed by hardware or computer software driving hardware depends on particular applications and design constraint conditions of the technical solutions. Persons skilled in the art may use different methods to implement the described functions for each particular application, but it should not be considered that the implementation goes beyond the scope of the present invention.

In the embodiments of the present invention, function module division may be performed on the base station, the UE (the first device), and the like based on the foregoing method examples. For example, function modules may be divided corresponding to the functions. Alternatively, two or more functions may be integrated into one processing module. The integrated module may be implemented in a form of hardware, or may be implemented in a form of a software functional module. It should be noted that the module division in the embodiments of the present invention is an example, and is merely logical function division. There may be another division manner in an actual implementation.

Figure 8:
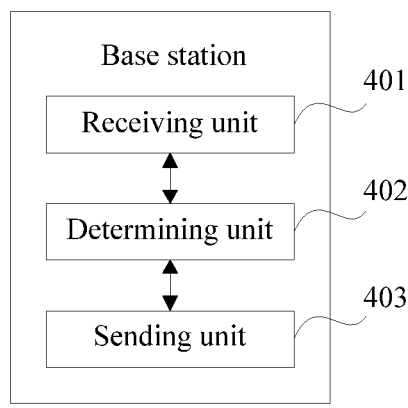
FIG. 8 is a structural block diagram of a base station according to an embodiment of the present invention.

When the function modules are divided corresponding to the functions, FIG. 8 is a possible schematic structural diagram of a base station according to the foregoing embodiment. The base station includes a receiving unit 401, a determining unit 402, and a sending unit 403. The receiving unit 401 is configured to support the base station in performing the process S1 in FIG. 3, the process 102 in FIG. 4, the process 202 in FIG. 6, and the process 302 in FIG. 7. The determining unit 402 is configured to support the base station in performing the process S2 in FIG. 3, the process 102 in FIG. 4, the process 202 in FIG. 6, and the process 302 in FIG. 7. The sending unit 403 is configured to support the base station in performing the process S3 in FIG. 3, the process 103 in FIG. 4, the process 203 in FIG. 6, and the process 303 in FIG. 7. All related content of the steps in the foregoing method embodiments may be referred for the functional descriptions of the corresponding functional modules. Details are not described herein again.

The receiving unit 401 may be a transceiver of the base station. The sending unit 403 may be a transceiver of the base station. The transceiver and the transceiver may be integrated together to form a transceiver of the base station. The determining unit 402 may be integrated into a processor of the base station. The processor invokes code in a memory to perform the foregoing functions of the determining unit.

Figure 9:
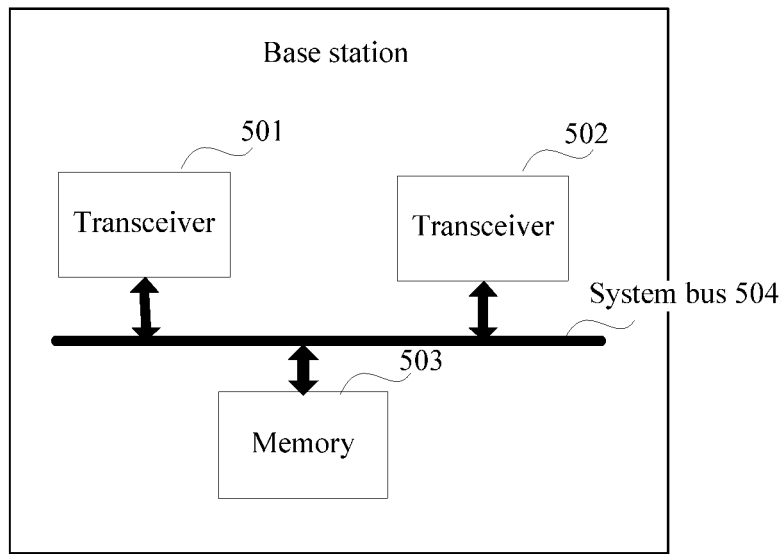
FIG. 9 is another structural block diagram of a base station according to an embodiment of the present invention.

Referring to FIG. 9, the base station includes a processor 501, a transceiver 502, a memory 503, and a bus 504. The transceiver 502, the processor 501, and the memory 503 are connected to each other by using the bus 504. The bus 504 may be a peripheral component interconnect (Peripheral Component Interconnect, PCI) bus, an extended industry standard architecture (Extended Industry Standard Architecture, EISA) bus, or the like. The bus may be classified into an address bus, a data bus, a control bus, or the like. For ease of indication, the bus is indicated by using only one bold line in FIG. 9. However, it does not indicate that there is only one bus or only one type of bus.

Figure 10:
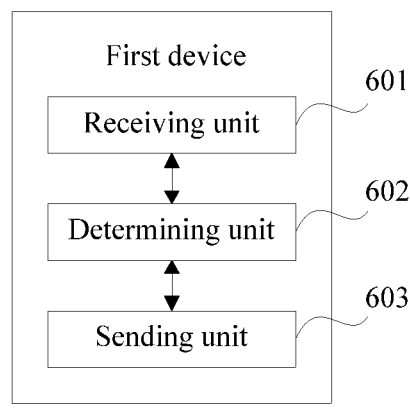
FIG. 10 is a structural block diagram of a first device according to an embodiment of the present invention.

When the function modules are divided corresponding to the functions, FIG. 10 is a possible schematic structural diagram of a first device according to the foregoing embodiment. The first device includes a receiving unit 601, a determining unit 602, and a sending unit 603. The receiving unit 601 is configured to support the first device in performing the process S4 in FIG. 3, the process 105 in FIG. 4, the process 204 in FIG. 6, and the process 305 in FIG. 7. The determining unit 602 is configured to support the base station in performing the process S5 in FIG. 3, the process 105 in FIG. 4, the related step of determining that the second device is paged in the process 204 in FIG. 6, and the related step of determining that the second device is paged in the process 305 in FIG. 7. The sending unit 603 is configured to support the base station in performing the process S6 in FIG. 3, the process 105 in FIG. 4, the process 205 in FIG. 6, and the process 306 in FIG. 7. All related content of the steps in the foregoing method embodiments may be referred for the functional descriptions of the corresponding functional modules. Details are not described herein again.

The receiving unit 601 may be a transceiver of the first device. The sending unit 603 may be a transceiver of the first device. The transceiver and the transceiver may be integrated together to form a transceiver of the first device. The determining unit 602 may be integrated into a processor of the first device. The first device invokes code in a memory to perform the foregoing functions of the determining unit.

Figure 11:
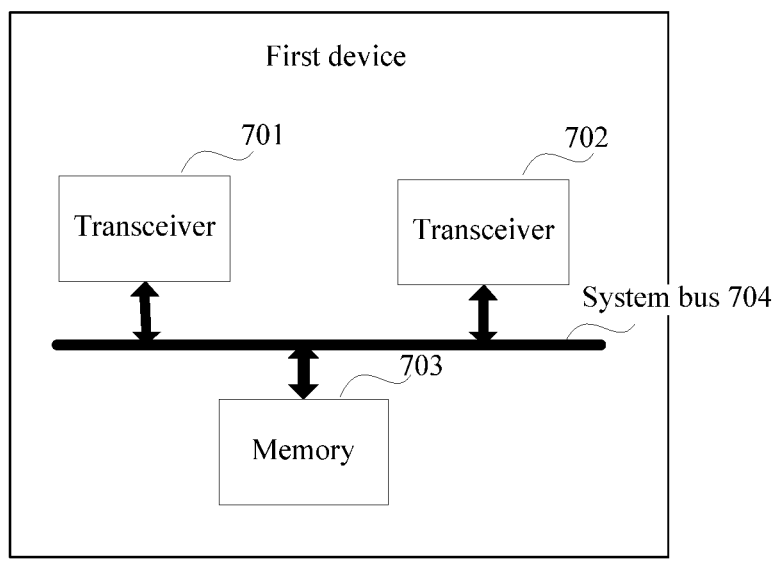
FIG. 11 is another structural block diagram of a first device according to an embodiment of the present invention.

Referring to FIG. 11, the first device includes a processor 701, a transceiver 702, a memory 703, and a bus 704. The transceiver 702, the processor 701, and the memory 703 are connected to each other by using the bus 704. The bus 704 may be a peripheral component interconnect (Peripheral Component Interconnect, PCI) bus, an extended industry standard architecture (Extended Industry Standard Architecture, EISA) bus, or the like. The bus may be classified into an address bus, a data bus, a control bus, or the like. For ease of indication, the bus is indicated by using only one bold line in FIG. 11. However, it does not indicate that there is only one bus or only one type of bus.

The methods or algorithm steps described with reference to the content disclosed in the present invention may be implemented in a hardware manner, or may be implemented in a manner of executing a software instruction by a processor. The software instruction may include a corresponding software module. The software module may be stored in a random access memory (Random Access Memory, RAM), a flash memory, a read-only memory (Read-Only Memory, ROM), an erasable programmable read-only memory (Erasable Programmable ROM, EPROM), an electrically erasable programmable read-only memory (Electrically EPROM, EEPROM), a register, a hard disk, a removable hard disk, a compact disc read-only memory (CD-ROM), or a storage medium in any other forms well-known in the art. A storage medium used as an example is coupled to the processor, so that the processor can read information from the storage medium, and can write information into the storage medium. Certainly, the storage medium may be a part of the processor. The processor and the storage medium may be located in an ASIC. In addition, the ASIC may be located in a core network interface device. Certainly, the processor and the storage medium may exist, as discrete components, in the core network interface device.

The foregoing descriptions about implementations allow persons skilled in the art to clearly understand that, for the purpose of convenient and brief description, division of the foregoing function modules is used as an example for illustration. In an actual application, the foregoing functions can be allocated to different modules and implemented according to a requirement, that is, an inner structure of an apparatus is divided into different function modules to implement all or part of the functions described above. For a detailed working process of the foregoing described apparatus, refer to a corresponding process in the foregoing method embodiments, and details are not further described herein.

The units described as separate parts may or may not be physically separate, and parts displayed as units may be one or more physical units, that is, may be located in one place, or may be distributed on different places. Some or all of the units may be selected according to actual requirements to achieve the objectives of the solutions in the embodiments. In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions in the present invention essentially, or the part contributing to the prior art, or all or some of the technical solutions may be implemented in the form of a software product. The software product is stored in a storage medium and includes several instructions for instructing a device (which may be a single-chip microcomputer, a chip, or the like) or a processor (processor) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or a compact disc.

The descriptions are only specific implementations of the present invention, but are not intended to limit the protection scope of the present invention. Any variation or replacement readily figured out by persons skilled in the art within the technical scope disclosed in the present invention shall fall within the protection scope of the present invention. Therefore, the protection scope of the present invention shall be subject to the protection scope of the claims.

What is claimed is:

1. A method, comprising:
   receiving, by a base station, a first message sent by a network side device, wherein the first message instructs the base station to page a second device;
   determining, by the base station, that a first paging occasion is a first paging occasion of a first device and a first paging occasion of the second device;
   sending, by the base station to the first device, in response to determining that the first paging occasion is the first paging occasion of the first device and the first paging occasion of the second device, a first paging message on the first paging occasion of the first device, wherein the first paging message pages the first device and carries an identifier of the second device; and
   sending, by the base station to the first device, in response to determining that the first paging occasion is the first paging occasion of the first device and the first paging occasion of the second device, a second paging message on the first paging occasion of the second device, wherein the second paging message carries the identifier of the second device and causes the first device to send a third paging message to the second device based on the second paging message, and further causes the first device to establish a connection to the second device based on the third paging message.

2. The method according to claim 1, further comprising:
   determining, by the base station, that a second paging occasion is a second paging occasion of the second device; and
   sending, by the base station, a fourth paging message on the second paging occasion of the second device, wherein the fourth paging message pages the second device, carries the identifier of the second device, causes the first device to send the third paging message to the second device, and further causes the first device to establish the connection to the second device based on the third paging message.

3. The method according to claim 1, further comprising:
   determining, by the base station, that a second paging occasion is a second paging occasion of the first device; and
   sending, by the base station, a fourth paging message on the second paging occasion of the first device, wherein the fourth paging message pages the second device, carries the identifier of the second device, causes the first device to send the third paging message to the second device, and further causes the first device to establish the connection to the second device based on the third paging message.

4. The method according to claim 1, wherein determining, by the base station, that the first paging occasion is the first paging occasion of the first device and the first paging occasion of the second device comprises:
   calculating, by the base station, the first paging occasion of the first device based on an identifier of the first device.

5. The method according to claim 1, wherein determining, by the base station, that the first paging occasion is the first paging occasion of the first device and the first paging occasion of the second device comprises:
   calculating, by the base station, the first paging occasion of the second device based on the identifier of the second device.

6. A method, comprising:
   receiving, by a first device from a base station, a first paging message on a first paging occasion of the first device, wherein the first paging message pages the first device, and carries an identifier of a second device, and wherein the first paging message is received based on a determination that a first paging occasion is the first paging occasion of the first device and a first paging occasion of the second device;
   receiving, by the first device from the base station, a second paging message on the first paging occasion of the second device, wherein the second paging message carries the identifier of the second device, and wherein the second paging message is received based on the determination that the first paging occasion is the first paging occasion of the first device and the first paging occasion of the second device;
   determining, by the first device based on the identifier of the second device carried in the second paging message, that the second device is being paged; and
   sending, based on determining that the second device is being paged, by the first device, a third paging message to the second device, and establishing a connection to the second device based on the third paging message.

7. The method according to claim 6, wherein determining that the second device is being paged comprises:

determining, by the first device based on the identifier of the second device carried in the first paging message, that the second device is being paged.

8. The method according to claim 6, wherein receiving the second paging message comprises:
receiving, by the first device, a fourth paging message on a second paging occasion of the second device, wherein the fourth paging message pages the second device, and carries the identifier of the second device.

9. The method according to claim 6, wherein receiving the second paging message comprises:
receiving, by the first device, a fourth paging message on a second paging occasion of the first device, wherein the fourth paging message pages the second device, and carries the identifier of the second device.

10. The method according to claim 9,
wherein determining that the second device is being paged comprises: determining, by the first device based on the identifier of the second device carried in the fourth paging message, that the second device is being paged.

11. The method according to claim 6, wherein sending, by the first device, the third paging message to the second device comprises:
calculating, by the first device, a third-message sending time point, and sending the third paging message to the second device at the third-message sending time point; or
calculating, by the first device, a message sending time length, and sending the third paging message to the second device within the message sending time length; or
sending, by the first device, the third paging message to the second device, and in response to receiving a feedback message from the second device, stopping sending the third paging message to the second device.

12. A base station, comprising:
a receiver, configured to receive a first message sent by a network side device, wherein the first message instructs the base station to page a second device;
a processor; and
a computer-readable storage medium storing a program to be executed by the processor, the program including instructions for:
determining that a first paging occasion is a first paging occasion of a first device and a first paging occasion of the second device; and
a transmitter, configured to:
send, in response to determining that the first paging occasion is the first paging occasion of the first device and the first paging occasion of the second device, a first paging message on the first paging occasion of the first device, wherein the first paging message pages the first device, and carries an identifier of the second device; and
send, in response to determining that the first paging occasion is the first paging occasion of the first device and the first paging occasion of the second device, a second paging message on the first paging occasion of the second device, wherein the second paging message carries the identifier of the second device, causes the first device to send a third paging message to the second device based on the second paging message, and further causes the first device to establish a connection to the second device based on the third paging message.

13. The base station according to claim 12, wherein the transmitter is further configured to:
send, based on a determination by the processor that a second paging occasion is a second paging occasion of the second device, a fourth paging message on the second paging occasion of the second device, wherein the fourth paging message pages the second device, carries the identifier of the second device, causes the first device to send the third paging message to the second device, and further causes the first device to establish the connection to the second device based on the third paging message; and
send, based on a determination by the processor that a third paging occasion is a second paging occasion of the first device, a fifth paging message on the second paging occasion of the first device, wherein the fifth paging message pages the second device, carries the identifier of the second device, causes the first device to send the third paging message to the second device, and further causes the first device to establish the connection to the second device based on the third paging message.

14. The base station according to claim 12, wherein the program further includes instructions for:
calculating the first paging occasion of the first device based on an identifier of the first device; or
calculating the first paging occasion of the second device based on the identifier of the second device.

15. A first device, comprising:
a receiver, configured to:
receive, from a base station, a first paging message on a first paging occasion of the first device, wherein the first paging message pages the first device, and carries an identifier of a second device, and wherein the first paging message is received based on a determination that a first paging occasion is the first paging occasion of the first device and a first paging occasion of the second device; and
receive, from the base station, a second paging message on the first paging occasion of the second device, wherein the second paging message carries the identifier of the second device, and wherein the second paging message is received based on the determination that the first paging occasion is the first paging occasion of the first device and the first paging occasion of the second device;
a processor;
a computer-readable storage medium storing a program to be executed by the processor, the program including instructions for:
determining, based on the identifier of the second device carried in the paging second message, that the second device is being paged; and
a transmitter, configured to send a third paging message to the second device, and establish a connection to the second device based on the third paging message.

16. The first device according to claim 15, wherein the receiver is further configured to:
receive a fourth paging message on a second paging occasion of the second device, wherein the fourth paging message pages the second device, and carries the identifier of the second device; and
receive a fifth paging message on a second paging occasion of the first device, wherein the fifth paging message pages the second device, and carries the identifier of the second device.

17. The first device according to claim 16, wherein the program further includes instructions for:
- determining, based on the identifier of the second device carried in the first paging message, that the second device is paged; or
- determining, based on the identifier of the second device carried in the second paging message, that the second device is paged.

18. The first device according to claim 15, wherein:
- the program further includes instructions for calculating a third-message sending time point, and the transmitter is configured to send the third paging message to the second device at the third-message sending time point; or
- the program further includes instructions for calculating a message sending time length, and the transmitter is configured to send the third paging message to the second device within the message sending time length; or
- the transmitter is configured to send the third paging message to the second device, and in response to the receiver receiving a feedback message from the second device, to stop sending the third paging message to the second device.

* * * * *